United States Patent

Imahashi et al.

[11] Patent Number: 4,478,363
[45] Date of Patent: Oct. 23, 1984

[54] METHOD OF PRODUCTION OF COMPOSITE BILLET FOR FUEL CLADDING TUBE

[75] Inventors: Hiromichi Imahashi; Shigeo Turuoka; Keiichi Kuniya, all of Hitachi; Tomio Iizuka; Akira Kawahara, both of Ibaraki, all of Japan

[73] Assignee: Hitachi, Ltd., Tokyo, Japan

[21] Appl. No.: 254,297

[22] Filed: Apr. 15, 1981

[30] Foreign Application Priority Data

Apr. 15, 1980 [JP] Japan ................................. 55-50747
Apr. 15, 1980 [JP] Japan ................................. 55-50748

[51] Int. Cl.³ ............................................ B21D 39/04
[52] U.S. Cl. .................................................. 228/131
[58] Field of Search ................... 228/173 A, 186, 243, 228/131; 72/62

[56] References Cited

U.S. PATENT DOCUMENTS

| | | | |
|---|---|---|---|
| 119,725 | 10/1871 | Thompson | 72/62 |
| 3,121,949 | 2/1964 | Wright | 228/186 |
| 4,015,765 | 4/1977 | Ahmed | 228/173 A |
| 4,049,184 | 9/1977 | Rozengart | 228/243 |
| 4,162,758 | 7/1979 | Mikarai | 228/173 A |
| 4,200,492 | 4/1980 | Armijo | 376/417 |
| 4,320,568 | 3/1982 | Herrod | 29/507 |

FOREIGN PATENT DOCUMENTS

| | | | |
|---|---|---|---|
| 54-61060 | 5/1979 | Japan | 228/186 |
| 55-94789 | 7/1980 | Japan | 228/186 |

*Primary Examiner*—Nicholas P. Godici
*Assistant Examiner*—Marc Hodak
*Attorney, Agent, or Firm*—Antonelli, Terry & Wands

[57] ABSTRACT

A method of production of a composite billet for a nuclear fuel cladding tube wherein a hollow inner billet of zirconium is inserted in a hollow outer billet of a nuclear fuel cladding material. Following insertion of a resilient member in the hollow inner billet, pressure is applied to the resilient member axially of the billets to force the inner billet against the outer billet, to produce a pressure bonding between an inner surface of the outer billet and an outer surface of the inner billet.

9 Claims, 7 Drawing Figures

METHOD OF PRODUCTION OF COMPOSITE BILLET FOR FUEL CLADDING TUBE

BACKGROUND OF THE INVENTION

This invention relates to fuel elements for nuclear reactors, and more particularly it is concerned with a novel method of production of a composite billet for a fuel cladding tube of a composite cladding type comprising a zirconium alloy casing and a metallic liner, formed of zirconium, which is provided to the inner surface of the zirconium alloy cladding.

A nuclear fuel element for a power reactor now widely used includes a nuclear fuel material sealed in a tubular casing or cladding formed of noncorrosive, nonreactive and good thermal conductive material. A plurality of such fuel elements are assembled in predetermined spacing in lattice form to provide a fuel assembly. A suitable number of fuel assemblies are assembled into a conglomerate of a nuclear fission chain reaction type or a reactor core capable of carrying out a self-maintaining nuclear fission. The reactor core is placed in a reactor vessel through which a coolant flows.

The cladding serves a plurality of purposes. One of the principal objects is to prevent the occurrence of the chemical reaction between the nuclear fuel and coolant or between the nuclear fuel and moderator. The second object is to prevent radioactive nuclear fission products, which are partly in a gaseous state, from leaking from the fuel and from entering the coolant or moderator. The cladding material generally used nowadays is stainless steel or zirconium alloy.

A number of problems are encountered when a certain type of metal or alloy is used as a cladding material for producing nuclear fuel elements for use in a reactor core, because the cladding material shows a mechanical or chemical reaction under specific conditions. Zirconium and its alloys are excellent nuclear fuel cladding materials when acting under stationary state conditions. This is because of the facts that zirconium and its alloys have a small neutron-absorption cross section, and that they are, at a temperature of below about 400° C., of high strength, ductile, very stable and nonreactive in the presence of pure water or steam generally used as coolant and moderator for a nuclear reactor.

On the other hand, the fuel elements behave in such a manner that, because of mutual action between the nuclear fuel, the cladding and fission products produced as a result of nuclear fission reaction, the cladding becomes brittle with the result that there is caused the fear of the occurrence of cracks. It has been ascertained that this undesirable behavior is promoted by mechanical stresses produced locally in the cladding due to the difference in the coefficient of thermal expansion between the fuel and the cladding. During operation of a nuclear reactor, fission products are released from the nuclear fuel as a result of fission reaction and remains on the surface of the cladding. In the presence of specific nuclear fission products such as iodine and cadmium etc., stress corrosion cracking occurs due to the action of local stresses and strain.

As a means for obviating these disadvantages, proposals have been made to provide a metallic barrier between the fuel and cladding, as disclosed in U.S. Ser. No. 838,161 dated Sept. 30, 1977 which has issued as U.S. Pat. No. 4,200,492 and U.S. Ser. No. 522,856 dated Nov. 11, 1974, for example. In these proposals made in the past, a proposal to use a composite type cladding including a sheet of zirconium of suitable purity attached in metal-to-metal bonding to the inner surface of a zirconium alloy casing as a metallic liner is expected to achieve the best result. In such proposal, the zirconium liner has a thickness which is about 5-30% of that of the cladding. As compared with zirconium alloys, zirconium is better able to remain in a soft state during irradiation by neutrons, so that it reduces local stresses in the nuclear fuel element and protects the cladding from stress corrosion cracking. An additional feature of zirconium is that it does not involve the problems of neutron capture penalty, heat transfer penalty and non-compatibility of materials. Besides zirconium, nickel, iron and copper may also be used to provide a metallic barrier.

A composite type cladding of the aforesaid construction has generally been fabricated as described hereinbelow. As shown in a chart in FIG. 1, a zirconium ingot for forming a metallic barrier and a zirconium alloy ingot for forming a cladding are prepared by the melting of briquet, and a hollow zirconium billet is inserted in a hollow zirconium alloy billet to provide a unitary composite billet, which is then extruded at an elevated temperature in the range between about 500° and 750° C. by a usual hot extrusion method to produce an extruded composite tube. The extruded composite tube is subjected to usual tube contraction by use of cold rolling process. Thus a composite tube having a cladding of desired dimensions is obtained.

In the cladding tube of a composite type, it is essential that the zirconium barrier have the desired dimensions and that a satisfactorily metallurgical bonding be formed between the zirconium liner and the cladding material over the entire area. To this end, it is necessary that the hollow zirconium billet (inner member) is integrated metallurgically to the hollow zirconium alloy billet (outer member) even in the state of a billet (that is, in the stage before hot extrusion), and that such metallurgical integration formed in the composite billet be maintained during the subsequent extrusion and tube contraction operations in which the billet undergoes deformation. The following methods have generally been used for obtaining such composite billet in which the inner and outer members are metallurgically integrated.

(1) The inner member is inserted in the outer member, and they are bonded together by explosion bonding.

(2) Following insertion of the inner member in the outer member, the composite billet is heated to effect diffusion bonding to obtain an integrated structure.

Since a fuel cladding tube requires very high reliability in performance, some disadvantages are caused with respect to the above-described conventional methods. More specifically, the method of (1) can not be applied to the production of a composite tube of small inner diameter (such as below about 30 mm). Further, in the explosion bonding, bonding between the outer and inner members does not become uniform in the direction of the axis of the composite billet and there occur other problems such as a riffle-like bonding interfaces being caused. The conventional method (2) requires the heating of the members to be bonded at elevated temperature over a prolonged time (at 750° C. for eight hours, for example). Moreover, the need to apply pressure during heating or to mechanically effect preliminary bonding so as to obtain uniform diffusion renders the process steps complex and makes it difficult to keep the operation condition at a suitable level. An additional disadvantage is that unless a vacuum or inert atmosphere is used, oxidation of the interface is unavoidable.

In order to reduce the dimensions of the composite billet produced by the aforesaid processes to obtain a fuel cladding tube of the usual dimensions, the composite billet must be worked in a high temperature atmosphere by hot working such as hot extrusion. Thus, there is caused the oxidation of the interface while the composite billet is being subjected to hot extrusion or other treatment, so that the formation of oxides at the interface reduces the bonding strength. Generally, the inner and outer members for forming a composite billet are machined before being assembled into a unitary structure, so that irregularities of several microns are originally present on their surfaces. Thus the problem of the bond strength being reduced due to formation of oxides at the interface has been unavoidable.

SUMMARY OF THE INVENTION

This invention has been developed for the purpose of obviating the aforesaid problems of the prior art. Accordingly, the object of the present invention is to obtain a method of production of a composite billet for a fuel cladding tube which enables a soundly metallurgical bonding to be produced between a zirconium inner member acting as a metallic barrier and an outer member serving as a cladding material.

DESCRIPTION OF THE PREFERRED EMBODIMENT

In bonding an inner billet of zirconium to an outer billet of zirconium alloy by mechanical means, the following steps are adopted in the method according to the present invention. The inner billet is first inserted in the outer billet, and then a pressure applying medium is inserted in the inner billet. A compressive load is applied to the pressure applying medium in the axial direction of the inner and outer billets to thereby expand the inner billet radially for making the inner billet into pressure engagement with the outer billet to achieve pressure bonding between the outer surface of the inner billet and the inner surface of the outer billet. In the method according to the invention, a resilient member formed as of rubber is used as the pressure applying medium. By this feature, it is possible to exert a uniform force on the inner billet over the entire area thereof both circumferentially and axially, because the pressure applying medium behaves as if it were a fluid. It is also possible to effect control of the force exerted on the inner billet, so that a mechanical bonding of high reliability can be produced without causing a change in the thickness of the inner billet.

In using the above-described method for producing a composite billet for a fuel cladding tube, it is essential that matters described hereinbelow be taken into consideration.

The load applied when an inner billet is expanded is obtained by the following equation:

$$W = PA_r/\eta \qquad (1)$$

where
W: tube expanding load (kg).
P: tube expanding pressure (kg/cm$^2$).
$A_r$: cross-sectional area of tube expanding rubber member (mm$^2$).
$\eta$: tube expanding efficiency (0.85–0.9).

Figure 1:
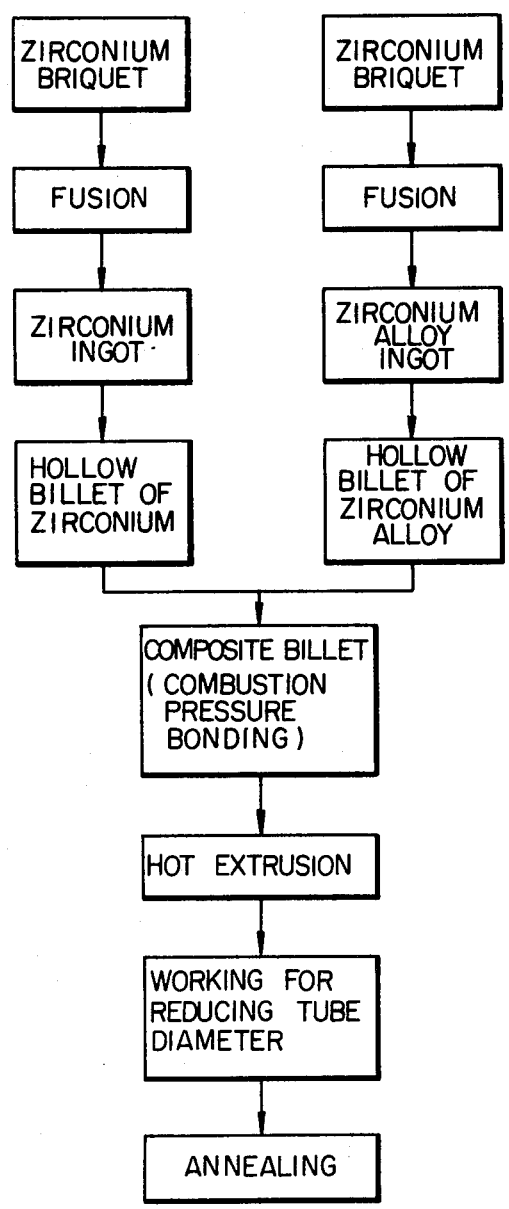
FIG. 1 is a chart showing the process steps for producing a composite fuel cladding tube of the prior art.
Figure 2:
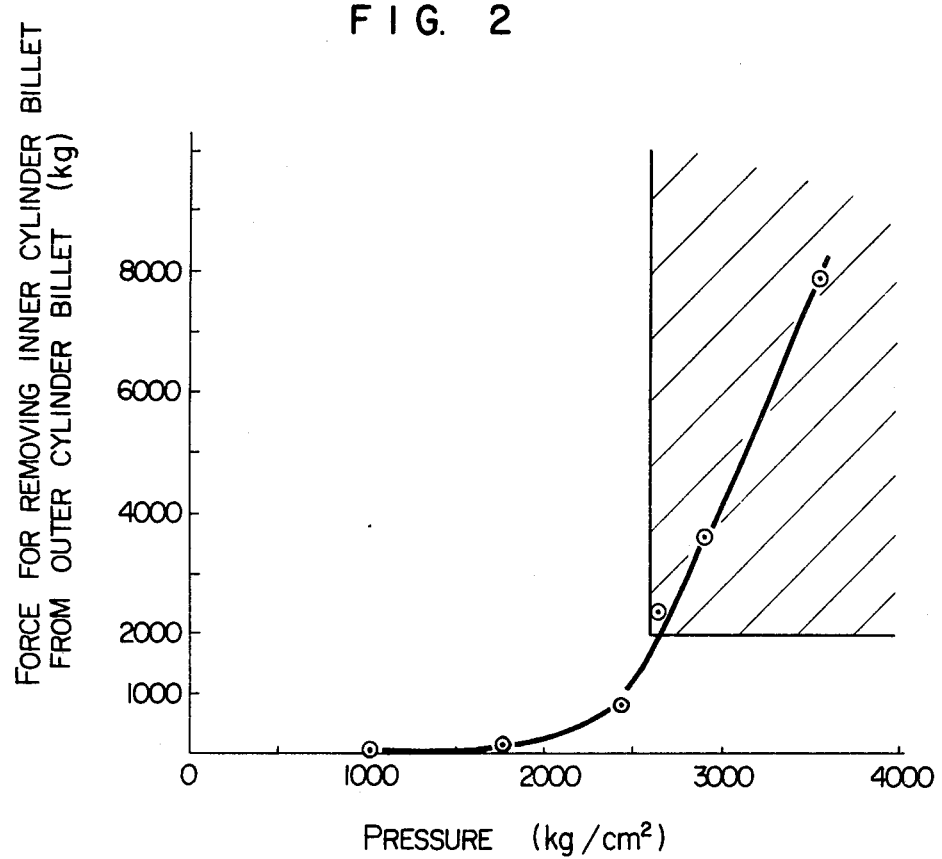
FIG. 2 is a diagram for explaining the conditions under which pressure is applied in the method according to the present invention.

FIG. 2 shows the results of tests in which there is shown the relation between bonding strength measured by drawing and the tube expanding pressure applied to the inner billet of zirconium according to equation (1). It will be seen that the higher the tube expanding pressure, the higher becomes the bonding strength. The bonding strength measured by drawing refers to a load required for separating the inner member of the composite tube from the outer member thereof by use of drawing. In producing a composite fuel cladding tube, it is preferable to increase the bonding strength because the composite billet obtained is subjected to hot extrusion and tube contraction working at a working rate of over 80%. Experiments have been conducted by the inventors to determine the minimum value as to preferable bonding strength. The results obtained show that the bonding strength is preferably within the range indicated by a hatch in FIG. 2.

It has been found that the ratio of the thickness of the inner member of zirconium to the thickness of the outer member of zirconium alloy at the time of tube expansion plays an important role in effecting control of the thickness of the zirconium liner to a desired level. The ratio of the thicknesses is represented by the following equation:

$$t = \frac{Zr}{Zry + Zr} \times 100(\%) \qquad (2)$$

where
t: thickness ratio.
Zr: thickness of zirconium inner member.
Zry: thickness of zirconium alloy outer member.

Attempts were made in which the expansion of the inner tubes is effected while varying the ratio of the thickness of the zirconium inner member to that of the zirconium alloy outer member, and there are obtained final composite tubes of different thicknesses to determine the thickness ratio at the last stage. The results show that the thickness ratio is reduced by 5–10% at the last stage in comparison with the thickness ratio of the composite billet measured at the time of billet expansion. This would show that zirconium is easier to be worked than zirconium alloys. Thus, to obtain the desired thickness for a zirconium liner, it would be preferable to increase beforehand such thickness ratio by 5–10% at the time of billet expansion.

By virtue of the features described hereinabove, the method of production of a fuel cladding tube of a composite cladding type according to the invention is capable of producing a composite cladding tube in which variations in the thickness of the zirconium liner becomes smaller than those of conventional methods and a uniform bonding can be obtained through the entire interface between the inner and outer members.

A specific example of the method according to the invention will now be described, An outer billet was prepared by melting a standard Zircaloy-2 alloy conforming to ASTMB353, grade RA-1 by arc melting. Zirconium was melted to prepare material for an inner billet serving as a metallic barrier, by arc melting.

Two ingots were hot-forged and then were machined into hollow billets to effect expansion according to the invention. The outer surface of the hollow inner billet and the inner surface of the hollow outer billet were polished to provide smooth surfaces having average surface roughness of not more than 10 μm, particularly not more than 6 μm. Such polishing is effected to render the lengthwise thickness of the metallic barrier in the final composite cladding tube product as much uniform as possible. Table 1 shows the dimensions and thickness ratios of the hollow billets to be expanded by using a resilient pressure applying medium. Examples 1 and 2 and examples 3 and 4 were prepared to provide the zirconium barrier with thickness of 75±5 μm and 80±5 μm, respectively. The length of the inner billet is made larger than that of the outer billet by 0.5 mm in examples 1 and 2, and by 3 mm in examples 3 and 4.

TABLE 1

| Example No. | Zircaloy-2 Outer Billet Length × Outer Dia. × Inner Dia. (mm) | Zirconium Inner Billet Length × Outer Dia. × Inner Dia. (mm) | Thickness Ratio (%) |
|---|---|---|---|
| 1 | 121.5 × 79.30 × 32.55 | 122.0 × 32.24 × 21.28 | 19.0 |
| 2 | 121.5 × 79.30 × 32.55 | 122.0 × 32.27 × 21.27 | 19.0 |
| 3 | 350.0 × 140.55 × 69.55 | 353.0 × 69.35 × 48.40 | 23.0 |
| 4 | 350.0 × 140.55 × 69.60 | 353.0 × 69.35 × 48.40 | 23.0 |

Figure 3:
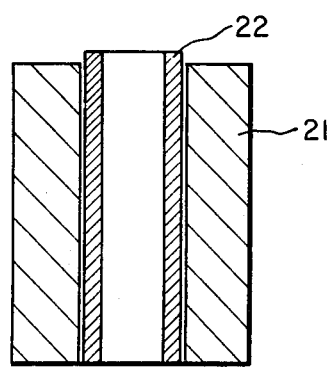
FIG. 3 is a vertical sectional view of the inner billet inserted in the outer billet, showing the manner in which they are fitted together.
Figure 4:
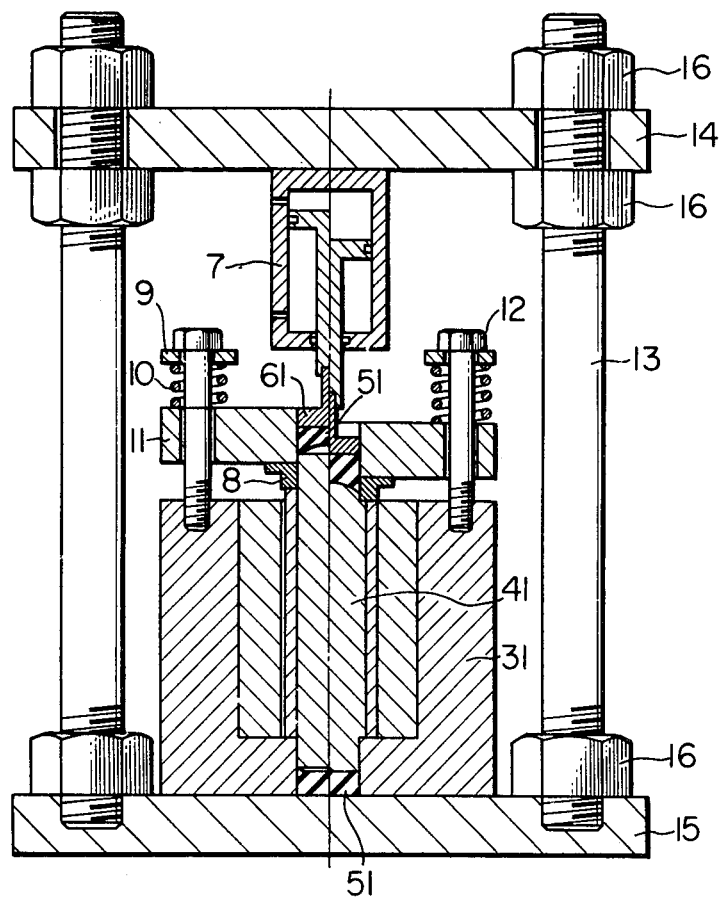
FIG. 4 is a vertical sectional view of an apparatus suitable for carrying the method according to the invention into practice.
Figure 7:
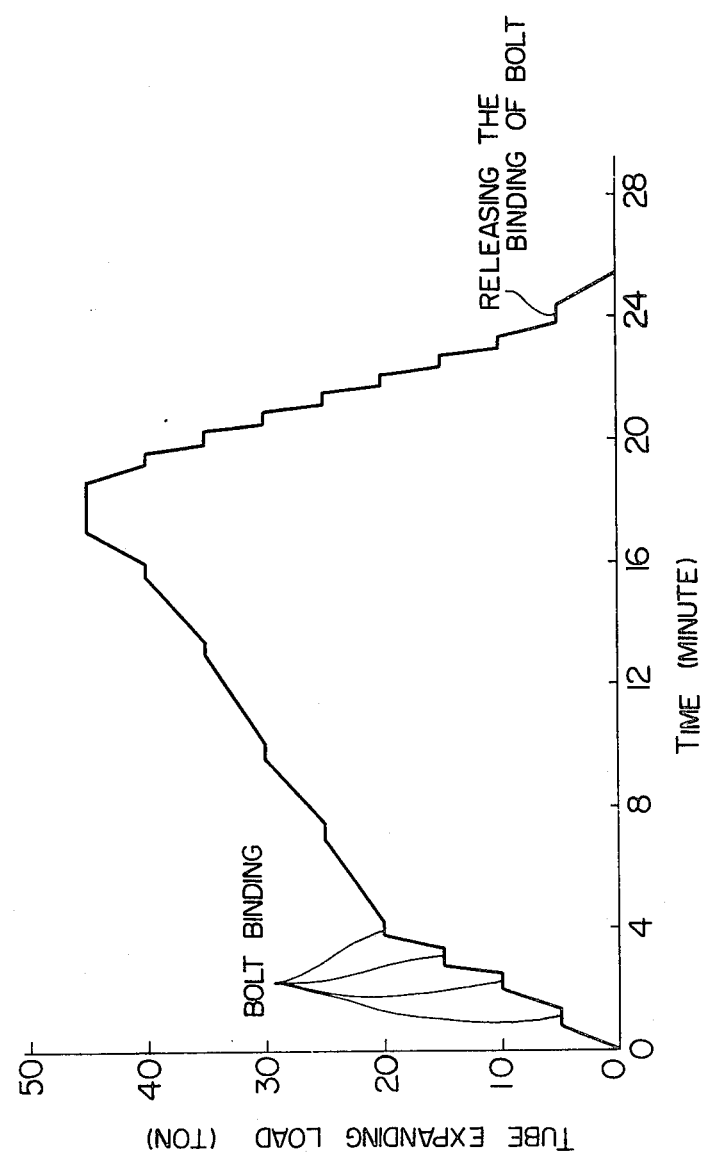
FIG. 7 is a diagram showing a relation between inner member expanding load and the lapse of time and showing time when the binding of bolts is effected.

FIG. 3 shows a composite billet as assembled. An apparatus suitable for use in pressure bonding the inner and outer members of the billet shown in FIG. 3 to provide a unitary structure is shown in FIG. 4. In the figure, a left half portion shows the composite billet before being worked and a right half shows the composite billet after being worked. As shown, the apparatus is placed on a base 15 connected to a plate 14 by support members 13 through nuts 16 and comprises a die 31 for supporting a composite billet, a pressure applying medium 41 of silicone rubber of a hardness from 60 to 65 inserted in the composite billet, a plurality of seal rings 51 of urethane rubber of a hardness from 90 to 95 arranged at opposite ends of the pressure applying medium 41, a pressure applying rod 61 for applying an axial compressive load to the pressure applying medium 41, a hydraulic cylinder 7 connected to the pressure applying rod 61 and a pressing member 8 secured to a lower end plate 11. As the composite billet is placed in the die 31, the pressing member 8 is forced against an inner billet 22. While the composite billet is in this condition, the hydraulic cylinder 7 is actuated to apply an axially directed load to the pressure applying medium 41 to compress same axially, to thereby expand the inner billet and achieve a pressure bonding between the outer surface of the inner billet and the inner surface of an outer billet. The pressing member 8 is moved axially by the biasing force of springs 10 mounted on the lower end plate 11 through clamp bolts 12 and washers 9 a distance corresponding to the amount of axial contraction of the inner billet while the binding of the clamp bolts 12 is effected to supplement the biasing force, to prevent plastic flow of the material of the pressure applying medium 41 through the gap, when the billet expanding operation is carried out. In FIG. 7, there are shown times when the binding of the clamp bolt 12 is effected. In the embodiment shown, the pressure applying medium 41 has a length greater than that of the billet members, to enable uniform bonding of the inner billet to the outer billet to be obtained from end to end axially thereof.

By using the apparatus shown in FIG. 4 and described hereinabove, pressure bonding of the inner and outer billets was achieved by using a pressure of 3000 kg/cm² in examples 1–4. No uneven deformation regarding the inner billet thickness was observed.

Table 2 shows the results of measurements of the dimensions of a composite tube produced as a final product and the thickness of the zirconium liner. The thickness of the zirconium liner has met the requirements through the entire length. Ultrasonic wave tests and observations of the cross section of the composite tube show that a soundly metallurgical bonding is formed between the zirconium liner and the Zircaloy cladding tube through the entire length and no defects are found at the interface.

TABLE 2

| Example | Outer Dia. (mm) | Inner Dia. (mm) | Thickness of Zirconium Liner (mm) |
|---|---|---|---|
| 1 | 10.80 | 0.86 | 75 ± 5 |
| 2 | 10.80 | 0.86 | 75 ± 5 |
| 3 | 10.80 | 0.86 | 80 ± 5 |
| 4 | 10.80 | 0.86 | 80 ± 5 |

In producing a pressure bonding between the inner and outer billets, operation was performed in atmospheric air. However, to obtain a defect-free interface between the inner and outer billets, bonding of the two billets may be carried out in a vacuum or in inert gas atmosphere, to essentially remove air, moisture and foreign matter that exist in minute gaps in the interface between the billets or to replace them by inert gas.

Figure 5:
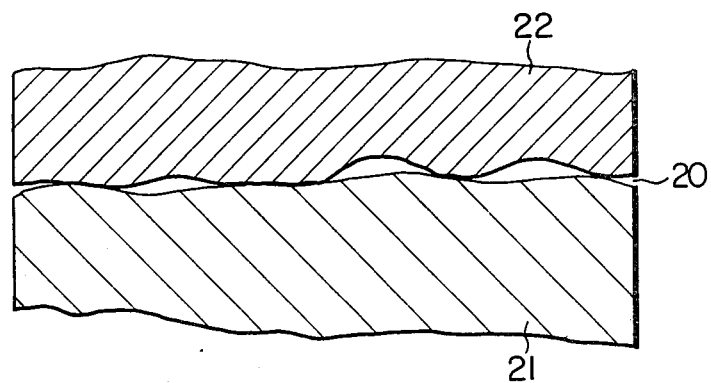
FIG. 5 is a model showing in a cross-sectional view the interface between the inner and outer billets in explanation of the present invention.
Figure 6:
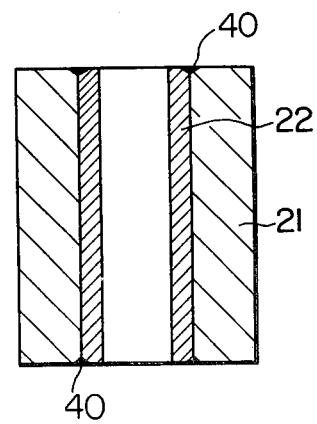
FIG. 6 is a vertical sectional view of a composite billet the opposite ends of which are hermetically sealed by electron beam welding.

FIG. 5 is a model showing the manner in which the inner member 22 of zirconium is bonded to the outer member 21 of zirconium alloy at an interface 20. The surfaces of the two billets 21 and 22 have a surface roughness on the order of several microns even if they are finished by means of a lathe and by polishing in the usual manner. When a composite tube is produced by bonding the surfaces of this condition, the bonding strength of the interface 20 depends on the area of contact. In order to increase the bonding strength at the interface 20, the interface is welded and sealed at opposite ends to avoid oxidation that might occur at the time of working. FIG. 6 is a sectional view of a composite billet in which the numeral 40 designates a seal provided by welding to opposite ends of the interface 20.

Table 3 shows the dimensions of composite billets each comprising a zirconium liner and a zircaloy cladding bonded together into a unitary structure by the method according to the invention.

In the specimens 1-4 of composite billets the opposite ends of the interface are hermetically sealed by electron beam welding. Table 4 shows the details of the conditions under which welding was carried out. To remove air, moisture and foreign matter from between the billet surfaces, the composite billets were allowed to stand in a vacuum of about $10^{-5}$ Torr for two hours before welding was effected. By this treatment, the composite billets obtained had a sound interface free from air, water or other undesirable elements and sealed at opposite ends by welding. By using such sound composite billets, sound composite cladding tubes can be produced.

Specimens 5-8 of composite billets were hermetically sealed by TIG welding. Table 5 shows the conditions under which welding was carried out. The atmospheric gas was helium. By using such sound composite billets, sound composite cladding tubes can be produced.

TABLE 3

| Specimen No. | Outer Dia. of Outer Zircaloy Billet (mm) | Outer Dia. of Inner Zirconium Billet (mm) | Inner Dia. of Inner Billet (mm) | Length of Composite Billet (mm) |
|---|---|---|---|---|
| 1 | 79.35 | 34.57 | 21.24 | 124.4 |
| 2 | 79.35 | 34.56 | 21.26 | 124.4 |
| 3 | 140.62 | 69.55 | 48.63 | 350.5 |
| 4 | 140.61 | 69.60 | 48.59 | 350.0 |
| 5 | 79.30 | 34.56 | 21.27 | 124.4 |
| 6 | 79.30 | 34.56 | 21.24 | 124.5 |
| 7 | 140.63 | 69.60 | 48.60 | 350.0 |
| 8 | 140.60 | 69.58 | 48.96 | 350.5 |

TABLE 4

| | Welding | |
|---|---|---|
| Item | Regular Welding | Cosmetic Welding |
| Acceleration Voltage | 150 kv | 150 kv |
| Beam Current | 3.76 A | 2.0 A |
| Filament Current | 1.6 A | 1.6 A |
| Welding Speed | 1.0 m/min | 1.0 m/min |
| Vacuum | $5 \times 10^{-6}$ Torr | $5 \times 10^{-5}$ Torr |
| Depth of Penetration | 2.2 mm | |

TABLE 5

| Item | Conditions |
|---|---|
| Welding Current | 260 A |
| Arc Voltage | 15 V |
| Welding Speed | 300 mm/min |
| Depth of Penetration | 3.0 mm |
| Atmosphere Gas | Helium |

It will be clearly seen in the examples shown and described hereinabove that the invention can achieve the following effects:

(1) The thickness of the metallic barrier can be precisely controlled, because of the ease with which dimensional control of the composite billets is effected.

(2) The process can be readily applied even to such cases as the composite billets have a small inner diameter.

(3) The method can be carried into practice in a shorter period of time and with a greater ease of control of operation conditions than methods of the prior art.

What is claimed is:

1. A method of producing a composite billet for a nuclear fuel cladding tube, comprising the steps of:
    preparing a hollow outer billet of a nuclear fuel cladding material and a hollow inner billet of an outer diameter smaller than the inner diameter of the hollow outer billet;
    inserting the hollow inner billet in the hollow outer billet;
    inserting in the hollow inner billet a resilient member longer than the inner billet and disposed so that the end portions of said resilient member are protruded axially outwardly from both ends of the inner billet;
    inserting said outer and inner billets and said resilient member into a die; and
    applying a pressure to the resilient member in the axial direction of the billets to force the inner billet against the outer billet to form a pressure bonding between an inner surface of the outer billet and an outer surface of the inner billet while preventing the resilient member from leaking that might otherwise be caused by a change in the axial length of the inner billet, whereby a uniform bonding can be obtained through the entire interface between said inner and outer billets.

2. A method of producing a composite billet for a nuclear fuel cladding tube, comprising the steps of:
    preparing a hollow outer billet of a nuclear fuel material and a hollow inner billet, said hollow inner billet having an outer diameter smaller than the inner diameter of said hollow outer billet and having a length slightly greater than that of the hollow outer billet; inserting the hollow inner billet in the hollow outer billet;
    inserting in the hollow inner billet a resilient member longer than the hollow inner billet and disposed so that the end portions of said resilient member are protruded axially outwardly from both ends of the inner billet;
    inserting said outer and inner billets and said resilient member into a die; and
    applying pressure to the resilient member in the axial direction of the billets to force the inner billet against the outer billet to form a pressure bonding between an inner surface of the outer billet and an outer surface of the inner billet while preventing the resilient member from leaking that might otherwise be caused by a change in the axial length of the inner billet, whereby a uniform bonding can be obtained through the entire interface between said inner and outer billets.

3. A method as claimed in claim 1 or 2, wherein said hollow inner billet is formed of zirconium.

4. A method as claimed in claim 1 or 2, wherein said hollow outer billet is formed of zirconium alloy.

5. A method as claimed in claim 1 or 2, wherein said resilient member is formed of silicone rubber.

6. A method as claimed in claim 1 or 2, wherein the ratio of the thickness of the hollow inner billet to the thickness of the hollow outer billet is greater by 5–10% than the corresponding ratio of the thickness of the inner member to the thickness of the outer member of a composite type cladding tube produced as a final product.

7. A method as claimed in claim 1 or 2, wherein the pressure applied to the resilient member is over about 2600 kg (in weight)/cm$^2$.

8. A method as claimed in claim 1 or 2, wherein the inner billet is pressed against the outer billet in a vacuum or in inert gas atmosphere.

9. A method as claimed in claim 1 or 2, wherein pressure is applied to the resilient member such that a uniform force is exerted on the inner billet over the entire area of said inner billet, both circumferentially and axially.

* * * * *